US005602528A

United States Patent [19]
Witchger

[11] Patent Number: 5,602,528
[45] Date of Patent: Feb. 11, 1997

[54] THEFT DETECTION MARKER AND METHOD

[75] Inventor: William J. Witchger, Indianapolis, Ind.

[73] Assignee: Marian Rubber Products Company, Inc., Indianapolis, Ind.

[21] Appl. No.: 492,892

[22] Filed: Jun. 20, 1995

[51] Int. Cl.$^6$ .................................. G08B 13/187
[52] U.S. Cl. ............... 340/551; 29/595; 29/DIG. 40; 156/233; 156/257; 156/271; 156/303; 340/572
[58] Field of Search .................. 340/551, 572; 148/100; 156/233, 257, 270, 271, 301, 302, 303, 311, 313, 324; 29/595, DIG. 40

[56] References Cited

U.S. PATENT DOCUMENTS

| | | | |
|---|---|---|---|
| 3,765,007 | 10/1973 | Elder | 340/551 |
| 3,983,552 | 9/1976 | Bakeman, Jr. et al. | 340/551 |
| 4,222,517 | 9/1980 | Richardson | 340/572 |
| 4,382,831 | 5/1983 | Clough et al. | 156/233 |
| 4,384,281 | 5/1983 | Cooper | 340/572 |
| 4,510,489 | 4/1985 | Anderson, III et al. | 340/572 |
| 4,510,490 | 4/1985 | Anderson, III et al. | 340/572 |
| 4,568,921 | 2/1986 | Pokalsky | 341/572 |
| 4,652,863 | 3/1987 | Hultman | 340/551 |
| 4,660,025 | 4/1987 | Humphrey | 340/572 |
| 4,682,154 | 7/1987 | Fearon et al. | 340/572 |
| 4,686,154 | 8/1987 | Mejia | 428/611 |
| 4,717,438 | 1/1988 | Benge et al. | 340/572 |
| 4,743,890 | 5/1988 | Hilzinger et al. | 340/551 |
| 4,779,076 | 10/1988 | Weaver | 340/551 |
| 4,797,658 | 1/1989 | Humphrey | 340/551 |
| 4,799,045 | 1/1989 | Fearon et al. | 340/572 |
| 4,849,736 | 7/1989 | Cordery | 340/551 |
| 4,864,281 | 9/1989 | Fearon et al. | 340/572 |
| 4,882,569 | 11/1989 | Dey | 340/572 |
| 4,935,724 | 6/1990 | Smith | 340/551 |
| 4,945,339 | 7/1990 | Yamauchi et al. | 340/551 |
| 4,956,636 | 9/1990 | Sansom et al. | 340/551 |
| 5,008,649 | 4/1991 | Klein | 340/572 |
| 5,017,907 | 5/1991 | Cordery et al. | 340/551 |
| 5,029,291 | 7/1991 | Zhou et al. | 340/551 |
| 5,083,112 | 1/1992 | Piotrowski et al. | 340/572 |
| 5,121,106 | 6/1992 | Kataria et al. | 340/572 |
| 5,130,698 | 7/1992 | Rauscher | 340/551 |
| 5,146,204 | 9/1992 | Zhou et al. | 340/551 |
| 5,182,062 | 1/1993 | Lee et al. | 156/303 |
| 5,240,541 | 8/1993 | Lin et al. | 156/270 |
| 5,304,983 | 4/1994 | Zhou et al. | 340/572 |
| 5,313,192 | 5/1994 | Ho et al. | 340/551 |
| 5,368,948 | 11/1994 | Davies | 428/611 |
| 5,401,584 | 3/1995 | Minasy et al. | 428/611 |
| 5,432,499 | 7/1995 | Montean | 340/572 |
| 5,455,563 | 10/1995 | Davies et al. | 340/551 |
| 5,495,230 | 2/1996 | Lian | 340/551 |

Primary Examiner—Glen Swann
Attorney, Agent, or Firm—Woodard, Emhardt, Naughton, Moriarty & McNett

[57] ABSTRACT

A marker device for merchandise items has blanks of high magnetic coercivity material spaced along a strip of high magnetic permeability material. The strip and blanks are the same width, produced from three ribbons of material, one ribbon of the high coercivity material, another of the high permeability material, and a third having a pressure sensitive adhesive surface in one process embodiment, and the third being a heat activated adhesive film in another process embodiment. The strip and blanks are thereby adhesively connected. Multiple strips of the marker devices are produced simultaneously by running adhesively connected ribbons through a gang of slitter knives.

15 Claims, 2 Drawing Sheets

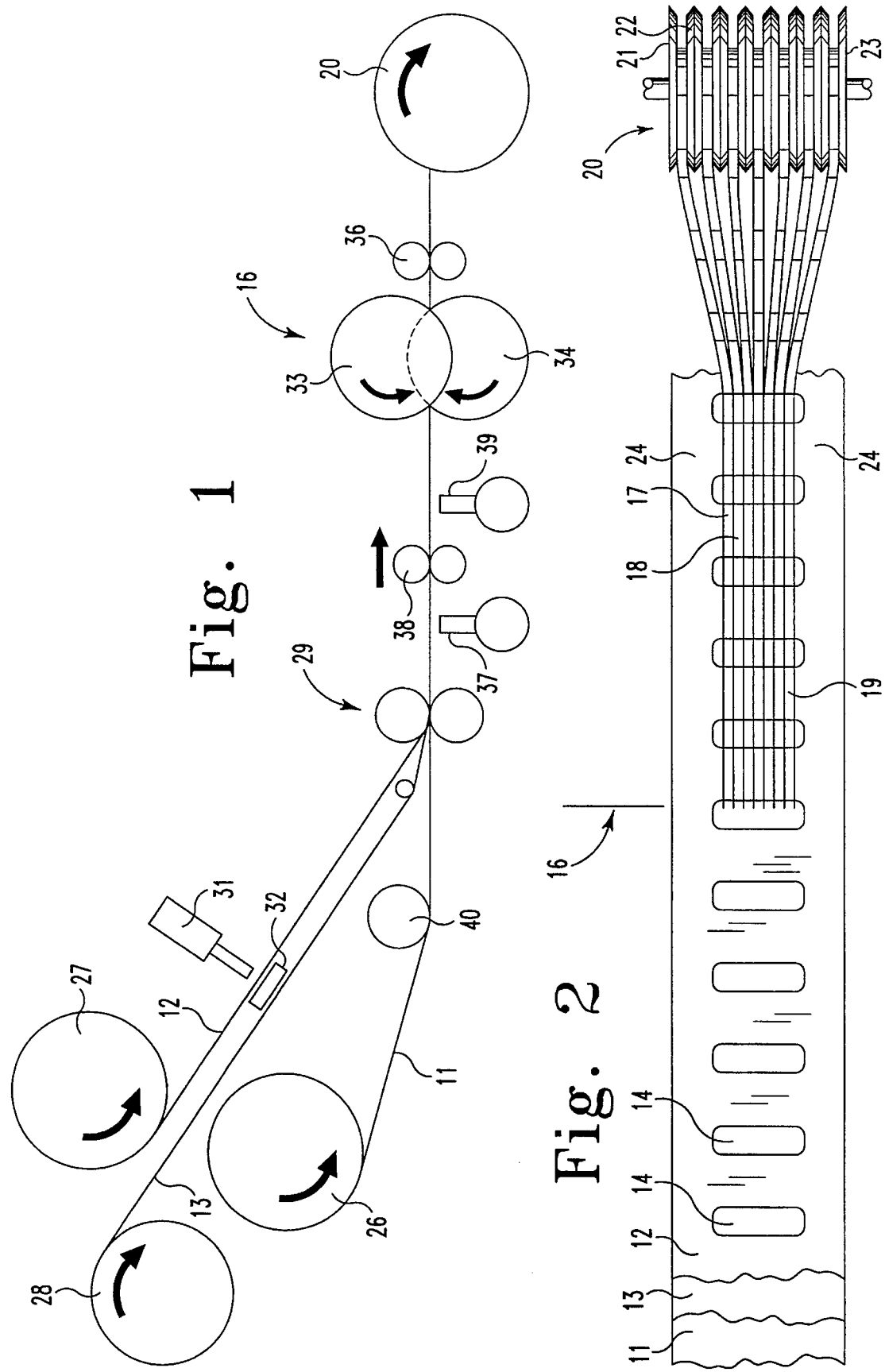

THEFT DETECTION MARKER AND METHOD

BACKGROUND OF THE INVENTION

1. Field of the Invention

This invention relates generally to merchandise theft deterrence and more particularly to a magnetic marker strip usable on or in the protected goods.

2. Description of the Prior Art

Many systems have been developed for inhibiting theft of goods from stores, by triggering alarms during movement of protected goods past sensors situated near exits. One such system is described in U.S. Pat. No. 5,401,584 issued Mar. 28, 1995. Other systems, devices and prior art are described in that patent and U.S. Pat. Nos. 5,304,983 and 5,029,291 and the patents discussed therein.

U.S. Pat. No. 5,401,584 discloses a marker made from a strip or ribbon of high magnetic permeability, with material of high magnetic coercivity electrodeposited at spaced locations along its length, to enable de-activation at the point of purchase, by means and methods already known in the art. But it remains desirable to produce markers that are easier to make, more reliable, more durable, and less expensive.

SUMMARY OF THE INVENTION

Described briefly, according to the present invention, a first ribbon of material of high magnetic permeability and a second ribbon of material of high magnetic coercivity are used. In one embodiment of the invention, slots are punched out of the second ribbon at spaced locations along its length. The two ribbons and an intermediate ribbon are fed from spools and merged, with the intermediate ribbon binding the first and second ribbons together, and the bound ribbons being pulled through slitter knives toward take-up reels, the slitter knives converting the ribbon into strips collected separately on the take-up reels. The resulting strips rolled up on the reels are continuous strips of the high permeability material, with blanks of the high coercivity material spaced along them.

In another embodiment of the invention, neither the first nor second ribbon need be punched. A substrate film ribbon with pressure sensitive adhesive on one face thereof is fed to a station where a shear cuts blanks off the end of the ribbon of high coercivity material. As the substrate film is pulled from its supply roll toward take-up reels, the blanks are deposited at closely spaced locations onto the adhesive face of the substrate film. As the substrate with the blanks on it advances toward the take-up reels, the ribbon of high permeability material is merged and pressed onto it to adhesively attach the merged ribbons together, and the substrate ribbon with the blanks and the high permeability material adhesively secured thereon proceed through slitter knives to produce continuous strips of the high permeability ribbon, with the spaced blanks of the high coercivity material thereon, each of the strips being wound simultaneously but separately onto the take-up reels as in the first described embodiment.

BRIEF DESCRIPTION OF THE DRAWINGS

FIG. 1 is a schematic diagram of a process for making marker strips according to one embodiment of the invention.

FIG. 2 is an enlarged fragmentary top plan view of the ribbon assembly during processing according to the FIG. 1 embodiment of the invention.

DESCRIPTION OF THE PREFERRED EMBODIMENT

Figure 3:
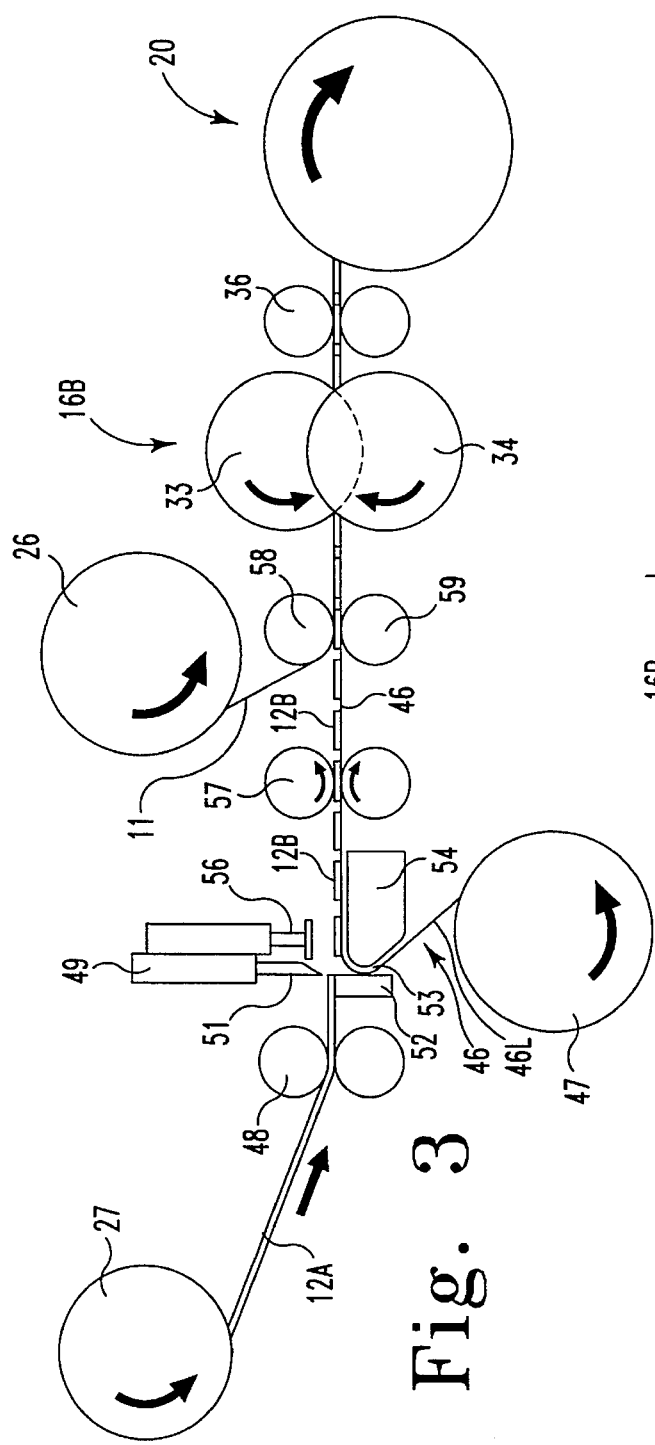
FIG. 3 is a process schematic diagram for making marker strips according to a second embodiment of the invention.

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now to the drawings in detail, there are three ribbons shown in FIGS. 1 and 2, two of them only fragmentarily at the left-hand end of FIG. 2. The bottom ribbon 11 is made of a material of high magnetic permeability and relatively low magnetic coercivity, about 25.4 mm wide and about 0.0152 mm thick. The top ribbon 12 is of a material having a high magnetic coercivity and is about 0.05 mm thick and about 25.4 mm wide. The intermediate ribbon 13 is an ethyl vinyl acetate film used as an adhesive interface as will be described. Ribbon 12 has a plurality of apertures or slots 14 therein at spaced locations along its length, the slots measuring about 3 mm lengthwise of the ribbon and spaced about 7 mm apart from the edge of one slot to the edge lengthwise i.e. front edge of the next slot of the ribbon. At location 16, the ribbon is sliced into strips such as 17, 18 and 19, for example, preferably into 20 or more strips that are less than 2.0 mm wide. For convenience in drawing, the strips are shown wider than they might be in production. Each of the strips is taken up on a reel such as 21 for strip 17, 22 for strip 18, and 23 for strip 19. The material 24 at the opposite edges can be scrapped, but need only be wide enough for the integrity of the assembly as it is moved through the processing, which will now be described.

Referring specifically now to FIG. 1, the manufacturing process is shown with a supply roll 26 for the first ribbon 11, a supply roll 27 for the second ribbon 12, and a supply roll 28 for the adhesive interface ribbon 13. The ribbons are pulled from all three supply rolls by pinch rolls 29. The ultimate destinations are the take-up reels indicated generally at 20 and which would include reels 21, 22, 23 and as many additional reels as are needed to collect the individual marker strips as they are produced in the process.

A punch 31 is associated with die 32 to punch the slots 14 in the ribbon 12 as it is pulled from the roll 27. Two gangs of rotary slitter knives are provided at a station 16 between the pinch rolls and the take-up reels. These include an upper gang 33 and lower gang 34, which interfit and sever the ribbon into the multiple strips at station 16. Additional pinch rolls 36 may be provided between the slitter station and the take-up reels, if desired.

In the operation of the system, immediately following the pinch rolls 29 in the direction of movement of the ribbons or webs, a heater 37 provides heat to melt the adhesive ribbon 13. The pinch rolls 38 squeeze the ribbons 11 and 12 together to assure thorough bonding and the cooler blower 39 cools the ribbon to secure the adhesive attachment. Following that, the ribbons pass through the slitter knives making the strips which are taken up on the various reels. Consequently, each of the strips has a series of blanks of the material of the second ribbon 12 spaced along its length and adhesively secured to the material 11. These reels of marker strips can be supplied to manufacturers, distributors, retail outlets marketing merchandise for which theft detection is desired.

Referring now to FIG. 3, it shows a process for making marker devices in strips which are similar to those produced by the FIG. 2 process. In this case, and since the two ribbons of metallic material can be the same material as for the first-described embodiment, the same reference numerals are given to the supply roll 26 of the high permeability material 11 and the supply roll 27 for the high coercivity ribbon material which, in this case, is given the reference numeral 12A because it does not get slots punched in it as was the case in the first embodiment. In this case, the third ribbon 46 is different and is supplied from roll 47. It has a pressure sensitive adhesive on the lower face 46L.

Slitter knife gangs 33 and 34, pinch rolls 36, and take-up reels 20 can be arranged as for the first embodiment.

Figure 4:
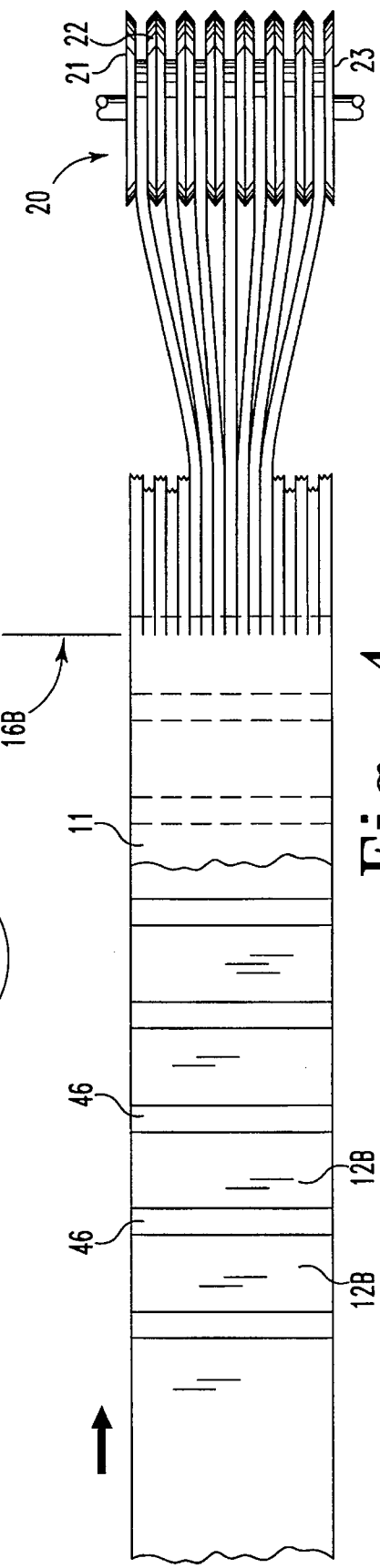
FIG. 4 is an enlarged fragmentary top plan view of the ribbon and strips according to the second embodiment.

In this embodiment of the invention, there is a set of pinch rolls 48 pulling material from the supply roll 27 and feeding it to a chopper 49 with an active upper shear blade 51 cooperating with lower stationary shear blade 52 to chop blanks off the ribbon 12A. As the substrate ribbon 46 is pulled up around the curved edge 53 of the platen 54, the plunger 56 of the placer unit pushes the blank onto the adhesive surface 46L which is now facing upward, whereby the blanks are adhesively fixed to the ribbon 46. Stop-and-go operation of the feed of ribbon 12A and ribbon 46 is believed preferable for accuracy of the cut and place function. The pinch rolls 57 advance the ribbon 46 a greater distance than rolls 48 advance the ribbon 12A each time a blank 12B is chopped from the ribbon 12A. In this way the spacing between the blanks is achieved as they are placed onto the ribbon 46. As in the FIGS. 1 and 2 embodiment, 7 mm blanks with the 3 mm spacing between blanks, can be readily achieved. Other combinations can be obtained, if desired. After ribbon 46 with blanks 12B thereon has passed the rolls 57, it enters between rolls 58 and 59 where the ribbon 11 from supply roll 26 is applied. Having in mind the fact that the material of the blanks, although shown exaggerated in the drawing, is about 0.05 mm thick, the application of roll 58 to the combination of ribbon 46 and blanks 12B causes the ribbon 11 to adhesively attach to ribbon 46 in the spaces between the blanks. Therefore, the combination departing the rolls 58 and 59 is a laminate of the ribbon 46, blanks 12B and ribbon 11. This laminar assembly is passed through the slitter knife gangs, feed rolls 36 and onto the take-up reels 20. The location of the slitter knives is designated 16B in FIGS. 3 and 4. In this particular process, the possibility of using the entire width of the high coercivity ribbon exists with either less edge strip waste than the previous embodiment or none at all.

For the two embodiments, the continuous ribbon of easily magnetizable, high magnetic permeability, low coercivity magnetic material has the desired magnetic characteristic that, when subjected to continuous alternating magnetic interrogation fields, the material will produce characteristic detectable disturbances of those fields. As examples, the ribbon can be a soft magnetic material such as Permalloy or an amorphous magnetic metal alloy such as Metglas, as referred to in the aforementioned U.S. Pat. No. 5,401,584, the disclosure of which to any extent necessary, is incorporated herein by reference. The magnetic characteristic desired for the material for the high coercivity ribbon is that, when magnetized, it will effectively prevent the material of the first ribbon from responding to the alternating magnetic field. An example may be a material known as Arnokrome brand desensitizing material. This ribbon may be used in the same or similar range of thickness as for the high permeability material.

As an example of the intermediate adhesive ribbon 13, an ethyl vinyl acetate (EVA film) such as Catalog No. DAF 899 manufactured by Dow Chemical, can be used. Other possibilities are a urethane adhesive resin film or an acrylic adhesive resin film. An alternate approach which can be considered with reference to FIG. 1 is to employ, instead of the intermediate adhesive ribbon 13, an adhesive applicator roll 40 against the upper face of ribbon 11 or, alternatively, against the lower face of ribbon 12, and applying an adhesive to one or the other, or both, of the ribbons so that they can be squeezed together by the rolls 29 with the adhesive cured as the ribbons are moved along the space between the rolls 29 and the slitter knife gang station at 16.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A method for producing a theft detection marker and comprising the steps of:

taking a first ribbon of a material having high magnetic permiability and a second ribbon of a material having high magnetic coercivity;

punching out areas of the second ribbon at spaced locations along its length to provide slots therein at spaced locations along its length;

moving the two ribbons toward take-up devices and adhesively connecting portions of the second ribbon to the first ribbon;

passing the connected ribbon portions through a slitting station to divide the connected ribbon portions into strips; and collecting the strips separately onto the take-up devices.

2. The method of claim 1 further comprising the step of:

applying adhesive directly to one of the ribbons before the adhesive connection step.

3. The method of claim 1 further comprising the step of:

taking a third ribbon of heat activatable adhesive;

moving the third ribbon between the first and second ribbons and toward the take-up devices;

sandwiching the third ribbon between the first and second ribbons; and applying heat to the sandwiched ribbons before passage through the slitting station, to adhesively connect the two ribbons before slitting.

4. The method of claim 3 further comprising the step of:

cooling the ribbons after adhesively connecting them and before slitting as they move toward the take-up devices.

5. The method of claim 1 further comprising the step of:

taking a third ribbon of film having a pressure sensitive adhesive surface;

moving the third ribbon toward the take-up devices;

shearing the second ribbon periodically and depositing blanks sheared therefrom onto the third ribbon at spaced locations on the third ribbon as the ribbons are moved toward the take-up devices.

6. The method of claim 5 further comprising the step of:

placing the blanks with pressure onto a pressure sensitive adhesive surface of the third ribbon as the blanks are deposited onto the third ribbon.

7. The method of claim 5 further comprising the step of:

adhesively connecting the third ribbon to the first ribbon before slitting.

8. A method for producing a theft detection device marker and comprising the steps of:

taking a first ribbon of a material having high magnetic permeability such that when subjected to a continuous alternating magnetic interrogation field, the material will produce characteristic detectable disturbances in the field; and taking a second ribbon of a material having higher magnetic coercivity such that, when magnetized, it will effectively prevent the material of the first ribbon from responding to the alternating magnetic field;

moving the two ribbons toward collectors;

punching out areas of the second ribbon at spaced locations along its length to provide slots therein at spaced locations along its length;

adhesively connecting portions of the second ribbon to the first ribbon;

passing the connected ribbon portions through a slitting station to divide the connected ribbons into strips; and delivering the strips to the collectors.

9. A theft detection marker comprising:

a strip of a first material having a high magnetic permeability;

a plurality of blanks of a second material having high magnetic coercivity spaced along the first material strip, the blanks having the same width as the strip;

adhesive material connecting the blanks to the strip;

the adhesive material extending substantially the full width of the blanks.

10. The marker of claim 9 and wherein:

the adhesive is on a substrate.

11. The marker of claim 10 and wherein:

the substrate is a plastic film, and the adhesive is pressure sensitive.

12. The marker of claim 9 wherein:

the adhesive is a heat-activated film.

13. The marker of claim 9 and wherein:

the adhesive material is directly contacting the strip and the blanks.

14. The marker of claim 13 and wherein:

the adhesive material is a resin.

15. The marker of claim 14 and wherein:

the adhesive material is a heat activated resin.

\* \* \* \* \*

UNITED STATES PATENT AND TRADEMARK OFFICE
CERTIFICATE OF CORRECTION

PATENT NO. : 5,602,528
DATED : February 11, 1997
INVENTOR(S) : William J. Witchger It is certified that error appears in the above-indentified patent and that said Letters Patent is hereby corrected as shown below:

In col. 4, line 32, please delete "permiability" and insert in lieu thereof --permeability--.

In col. 6, line 15, please add --material-- after "adhesive".

Signed and Sealed this

Ninth Day of December, 1997

Attest:

BRUCE LEHMAN

Attesting Officer

Commissioner of Patents and Trademarks